United States Patent [19]

Leeper, Jr.

[11] 4,271,880
[45] Jun. 9, 1981

[54] MULTIPLE PURPOSE WOODWORKING APPARATUS

[76] Inventor: William E. Leeper, Jr., 3405 S. Independence, Oklahoma City, Okla. 73119

[21] Appl. No.: 116,944

[22] Filed: Jan. 30, 1980

Related U.S. Application Data

[63] Continuation of Ser. No. 855,663, Nov. 29, 1977, abandoned, and a continuation-in-part of Ser. No. 686,167, May 17, 1976, Pat. No. 4,060,112.

[51] Int. Cl.³ .............................................. B27C 5/02
[52] U.S. Cl. ........................... 144/134 R; 144/114 R; 409/34
[58] Field of Search .............. 144/1 R, 2 R, 1 B, 1 H, 144/114 R, 117 R, 129, 134 R, 136 R, 35 R, 323; 83/477, 491; 409/34

[56] References Cited

U.S. PATENT DOCUMENTS

| 2,619,135 | 11/1952 | Callaway | 144/35 R X |
| 3,008,501 | 11/1961 | Hammer | 144/134 R X |
| 3,718,168 | 2/1973 | Berends | 144/117 R |

Primary Examiner—W. Donald Bray
Attorney, Agent, or Firm—Robert M. Hessin

[57] ABSTRACT

An improved universal shaper assembly adapted to rotate various forms of shaper cutters about a vertical axis and, alternately, about a horizontal axis. the assembly is provided with a vertically adjustable horizontal workpiece supporting table for use in conjunction with horizontally rotated shaper cutters. Also disclosed is a horizontal cutter adapter assembly for converting a conventional universal shaper having a vertical spindle to provide a woodworking apparatus for horizontally rotating a shaper cutter over a vertically adjustable workpiece supporting table.

3 Claims, 8 Drawing Figures

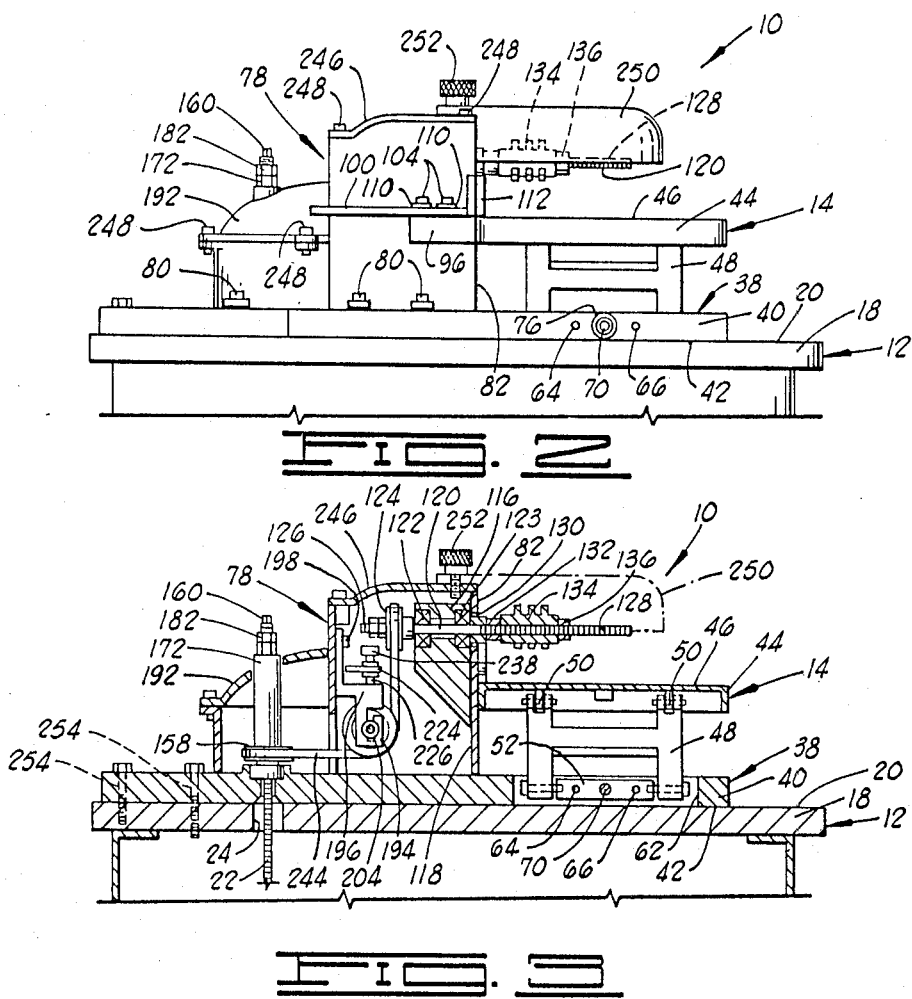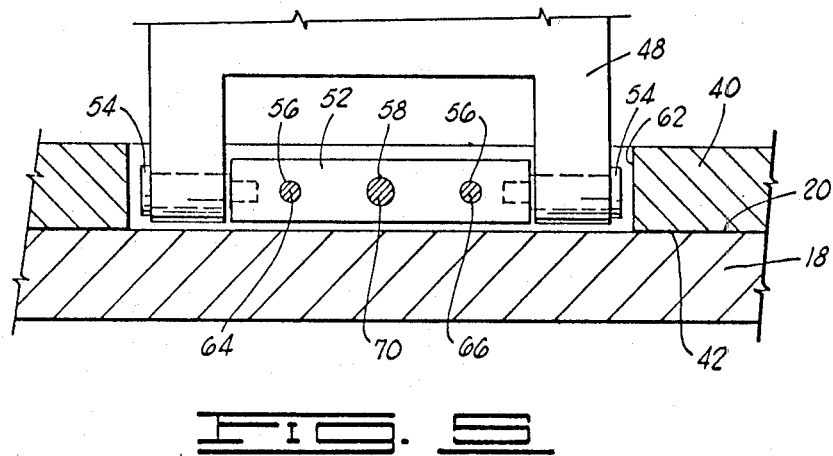

MULTIPLE PURPOSE WOODWORKING APPARATUS

CROSS-REFERENCE TO RELATED APPLICATIONS

This is a continuation of application Ser. No. 855,663, filed Nov. 29, 1977, now abandoned.

This application is a continuation-in-part of U.S. Application Ser. No. 686,167 entitled "Multiple Purpose Woodworking Apparatus", as filed on May 17, 1976 now U.S. Pat. No. 4,060,112.

BACKGROUND OF THE INVENTION

1. Field of the Invention

This invention relates generally to improvements in woodworking tools, and more particularly, but not by way of limitation, to an improved universal shaper mechanism.

2. Description of the Prior Art

The prior art contains a number of teachings of universal spindle shaper structures each of which employs a vertical spindle extending through a horizontal workpiece supporting table which carries and rotates about a vertical axis various forms of shaper cutters. The prior art also contains a number of teachings of relatively large, heavy and expensive moulding machines for use in forming moulding patterns in relatively long pieces of wood, which moulding machines employ horizontally aligned spindles which extend over horizontal workpiece supporting tables and rotate various forms of moulding cutters about this horizontal axis of rotation.

Until now, however, no mechanism has been available to convert a conventional universal vertical spindle shaper for rotation of shaper cutters about a horizontal axis of rotation. Such mechanisms have been strictly limited to the expensive moulding machines which, by their very nature, are essentially restricted to fixed installations such as in mills and are not adaptable for on-site carpentry and cabinet making undertakings.

The present invention contemplates a universal shaper adapted for alternately rotating a cutter about a vertical axis and about a horizontal axis. Such apparatus includes a base, a horizontal shaper table supported by the base having a horizontal top surface, a spindle vertically journaled on the base and extendable upwardly beyond the plane of the horizontal top surface of the shaper table, and drive means carried by the base for rotating the spindle about a vertical axis. The mechanism further includes means operatively engageable with the vertical spindle for securing a cutter thereto for rotation therewith. The universal shaper further includes a table adapter assembly which comprises a table adapter base having a horizontal bottom surface supportable on the top surface of the shaper table, a workpiece supporting table having a horizontal top surface and positioned above the table adapter base, and means for interconnecting the table adapter base and the workpiece supporting table. A power input shaft is vertically journaled on the table adapter assembly and a power output shaft is horizontally journaled on the table adapter assembly. Means are provided for drivingly interconnecting the power input shaft and the vertical spindle. The table adapter assembly carries means for drivingly interconnecting the power input shaft and the power output shaft to transmit rotational movement between these shafts. The apparatus also includes means operatively engageable with the power output shaft for securing a cutter thereto for rotation therewith.

Alternatively, the horizontal cutter attachment may be independently mounted and powered from a selected work table and power source.

An advantage of the present invention resides in the provision of apparatus which increases the efficiency of universal woodworking shapers.

Another advantage of the present invention resides in the provision of increased flexibility of operation of existing universal spindle shapers.

A further advantage of the present invention resides in the provision of an attachment for use with a conventional universal spindle shaper to adapt it for horizontal rotation of shaper cutters.

Yet another advantage of the present invention resides in the provision of conveniently portable apparatus for adapting a conventional universal spindle shaper whereby the combined structure can function in the manner of a conventional moulding machine in on-site applications.

A still further advantage of the present invention resides in the provision of a horizontal cutter attachment for use with universal spindle shaper mechanisms which is light in weight, economical in construction and simple to install and operate.

Other objects and advantages of the present invention will be evident from the following detailed description when read in conjunction with the accompanying drawings.

BRIEF DESCRIPTION OF THE DRAWINGS

FIG. 2 is a partial side elevation view of the universal shaper assembly of FIG. 1.

FIG. 3 is a cross-sectional view taken substantially along line 3—3 of FIG. 1.

FIG. 5 is an enlarged partial cross-sectional view illustrating structural details of the mechanism for adjusting the height of the workpiece supporting table relative to the table adapter base.

DETAILED DESCRIPTION OF THE INVENTION

Figure 1:
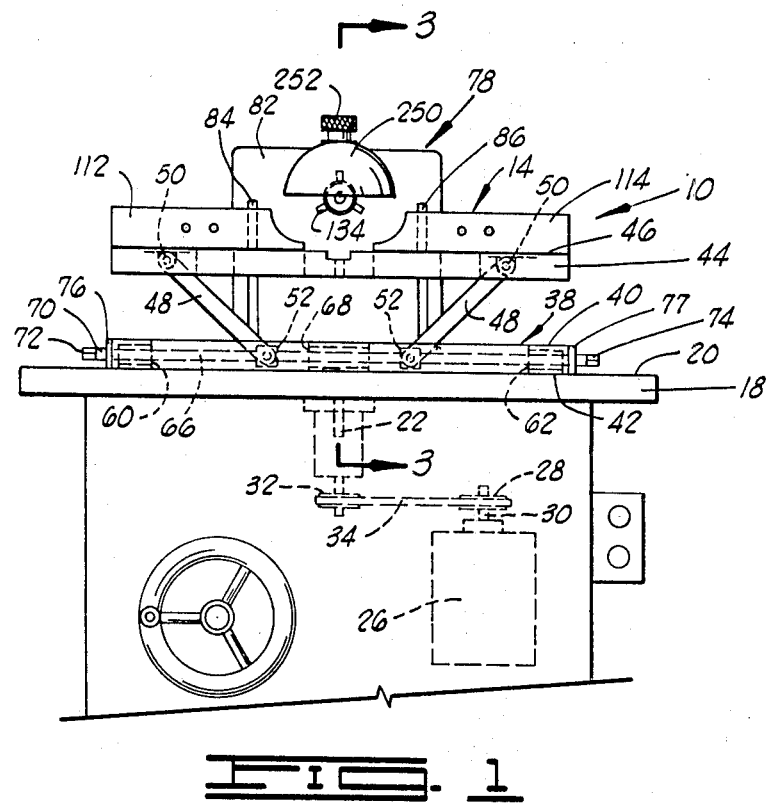
FIG. 1 is a front elevational view of the universal shaper assembly of the present invention illustrating a horizontal cutter adapter attachment installed on a universal spindle shaper.

Referring now to the drawings, a universal shaper assembly 10 is disclosed therein and generally comprises a conventional universal spindle shaper 12 and a horizontal cutter adapter attachment 14.

The universal spindle shaper 12 is preferably of conventional construction and includes a supporting base 16 upon which is mounted a horizontal shaper table 18 having a horizontal top surface 20 formed thereon. A spindle 22 is vertically journaled on the base 16 and extends upwardly through an aperture 24 formed in the shaper table 18. An electric drive motor 26, or other suitable drive means, is mounted on the base 16, below the shaper table 18, and is drivingly connected to the spindle 22 by suitable means. Such suitable means may include a drive pulley 28 on the output shaft 30 of the motor 26 and a driven pulley 32 secured to the spindle 22 with a conventional V-belt 34 drivingly interconnecting the pulleys 28 and 32.

The upper end portion 36 of the spindle 22 is preferably externally threaded whereby conventional shaper cutters and depth collars received thereon may be drivingly secured thereto by means of a matching internally threaded nut threadedly secured on the spindle. Typical of such conventional universal spindle shapers are those units manufactured by Rockwell International and the Powermatic Division of Houdaille Industries, and the units sold by Sears, Roebuck and Co. under the Craftsman trademark.

The horizontal cutter adapter attachment 14 includes a table adapter assembly 38 which includes a table adapter base 40 having a horizontal bottom surface 42 which is supportable on the top surface 20 of the horizontal shaper table 18. The table adapter assembly 38 further includes a workpiece supporting table 44 having a horizontal top surface 46 and positioned above the table adapter base 40. A pair of H-shaped support frames 48 are each pivotally secured at their respective upper ends to the underside of the workpiece support table 44 as shown at 50. The lower end portions of each support frame 48 are pivotally secured to a respective cross member 52 by means of suitable bolts 54. Each cross member 52 includes a pair of parallel aligned apertures 56 formed therein with an internally threaded aperture 58 disposed intermediate the apertures 56 and in parallel alignment therewith. The aperture 58 in one of the cross members 52 is right hand threaded while the aperture 58 in the other cross member 52 is left hand threaded. The cross members 52 are disposed respectively in cavities 60 and 62 formed in the table adapter base 40.

A pair of parallel aligned guide rods 64 and 66 extend horizontally through the cavities 60 and 62 and are slidably received through the respective apertures 56 of the cross members 52 to provide for sliding horizontal movement of the cross members 52 within the cavities 60 and 62. The opposite ends of the guide rods 64 and 66 are fixedly secured to the table adapter base 40. The guide rods 64 and 66 pass through corresponding parallel aligned apertures formed in that portion of the table adapter base 40 intermediate the cavities 60 and 62 as shown at 68 in FIGS. 1 and 4.

An adjustment rod 70 extends through the table adapter base 40 and parallel with and intermediate the guide rods 64 and 66. The adjustment rod 70 is journaled at its opposite ends in suitable bearings in the table adapter base 40 adjacent the cavities 60 and 62 and in a suitable bearing within the portion 68 of the table adapter base intermediate the cavities 60 and 62. The portions of the adjustment rod 70 disposed within the cavities 60 and 62 are each externally threaded. The externally threaded portion of the adjustment rod 70 disposed in the cavity 60 extends through and is mutually threadedly engaged with the internal threads of the aperture 58 in the cross member 52 disposed therein. Similarly, the externally threaded portion of the adjustment rod 70 disposed within the cavity 62 extends through and is threadedly engaged with the internally threaded portion of the aperture 58 in the other cross member 52 disposed with the cavity 62. The externally threaded portion of the adjustment rod 70 within the cavity 60 has a left hand thread formed thereon which corresponds to the internal left hand thread of the aperture 58 with which it is threadedly engaged. The externally threaded portion of the adjustment rod 70 within the cavity 62 has a right hand thread thereon which is threadedly engaged with the right hand integral thread of the aperture 58 of the cross member 52 in the cavity 62.

The outer end portions 72 and 74 of the adjustment rod 70 extend beyond the ends of the table adapter base 40 and include radially outwardly extending flanges 76 and 77 formed thereon, respectively, to prevent horizontal displacement of the adjustment rod 70 relative to the table adapter base 40. Either or both of the end portions 72 and 74 of the adjustment rod 70 may be suitably equipped with a non-circular surface formed thereon, such as wrench flats, whereby the adjustment rod 70 may be engaged by suitable wrench means or the like for rotation thereof relative to the table adapter base 40 to thereby cause horizontal movement of the cross members 52 in opposite directions thus causing relative vertical displacement between the table adapter base 40 and the workpiece supporting table 44.

It will be seen in viewing FIG. 1 that when rotation of the adjustment rod 70 causes the cross members 52 to be moved horizontally apart from one another, the workpiece supporting table 44 will be raised relative to the table adapter base 40. Conversely, when the rotation of the adjustment rod 70 is in the opposite direction and the cross members 52 are thereby moved horizontally toward each other the workpiece supporting table 44 is lowered relative to the table adapter base 40. The rigid structure defined by the table adapter base 40, through its interconnection with the workpiece supporting table 44 via the support frames 48, cross members 52, guide rods 64 and 66 and adjustment rod 70 maintains the horizontal top surface of the workpiece supporting table 44 in parallel relation with the horizontal bottom surface 42 of the table adapter base 40 throughout the vertical height adjustment of the workpiece supporting table relative to the table adapter base.

A rigid housing assembly 78 is mounted on the table adapter base 40 by suitable means such as threaded bolts 80. The housing assembly 78 includes a vertical front wall 82 disposed adjacent the workpiece supporting table 44. The wall 82 includes a pair of vertical slots 84 and 86 formed therein through which a corresponding pair of horizontally extending threaded studs 88 and 90, mounted in the workpiece supporting table 44, extend. Wing nuts 92 and 94 are threadedly engaged with the studs 88 and 90 and provide means for securing the workpiece supporting table 44 to the vertical front wall 82 when the workpiece supporting table height has been adjusted through manipulation of the adjustment rod 70 as described above.

A pair of ears 96 and 98 are formed on the workpiece supporting table 44 and extend horizontally therefrom on opposite sides of the vertical front wall 82. Fence brackets 100 and 102 are positioned respectively on the top surfaces of the ears 96 and 98 and are secured thereto by means of threaded bolts 104 which pass through respective slots 106 and 108 in the fence brackets 100 and 102 into threaded engagement in corresponding tapped holes in the ears 96 and 98. Suitable guide blocks 110 are disposed between the bolts 104 and the slots 106 and 108. Vertical guide fences 112 and 114 are fixedly secured to the fence brackets 100 and 102, respectively.

It will be seen that by loosening the threaded bolts 104, the fence brackets 100 and 102, with the guide fences 112 and 114 secured thereto, may be moved horizontally relative to the workpiece supporting table 44. When the guide fences are positioned as desired over the horizontal top surface 46 of the workpiece supporting table 44, the threaded bolts 104 can be re-tightened to secure the guide fences 112 and 114 in the desired position.

A spindle bearing housing 116 is disposed within the rigid housing assembly 78 and is fixedly secured to the inner surface 118 of the vertical front wall 82 by suitable means such as threaded bolts. The spindle bearing housing 116 journally supports a horizontal power output shaft or spindle 120 by means of a pair of bearings 122 and 123 which may suitably be sealed ball bearings. A driven pulley 124 is drivingly secured to the inner end portion 126 of the power output shaft 120. The outer end portion 128 of the upper output shaft 120 extends through an aperture 130 formed in the vertical front wall 82. The outer end portion 128 is preferably externally threaded whereby one or more spacing collars 132 and one or more shaper cutters 134 received about the outer end portion 128 can be drivingly secured by means of a corresponding internally threaded retaining nut 136 engaged on the output shaft 120.

Figure 6:
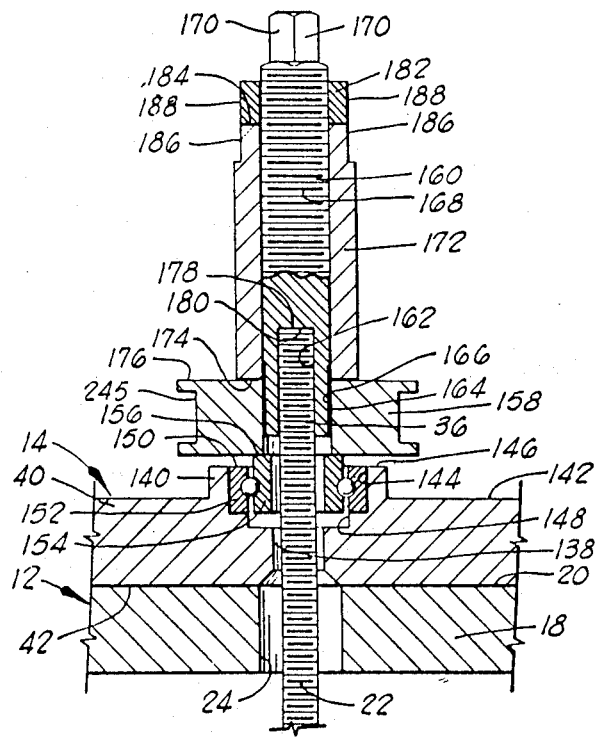
FIG. 6 is an enlarged cross-sectional view illustrating construction details of the interconnection between the horizontal cutter adapter attachment and the spindle of the universal spindle shaper.
Figure 7:
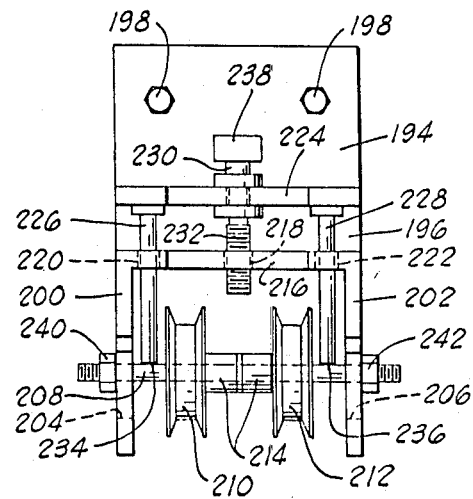
FIG. 7 is an enlarged elevation view illustrating the details of construction of the idler pulley subassembly.

The rigid housing assembly 78 includes an aperture 138 formed in the table adapter base 40 through which the spindle 22 of the universal spindle shaper 12 extends, as shown in FIGS. 3 and 6. The aperture 138 communicates with an annular rib 140 formed on the upper surface 142 of the table adapter base 40. The aperture 138 includes a first counterbore 144 formed therein which communicates with the upper end face 146 of the annular rib 140. A second counterbore 148 is also formed in the aperture 138. A suitable bearing 150 is mounted in the aperture 138 with the outer race 152 thereof rigidly received within the first counterbore 144 such as by a press fit. The inner race 154 of the bearing includes an upper end face 156 which extends a distance above the end face 146 of the annular rib 140. The upper end portion 36 of the spindle 22 is received through and extends upwardly beyond the inner race 154.

A drive pulley 158 is received on and disposed about the upper end portion 36 of the spindle 22 and is supported on the upper end face 156 of the inner race 154. An inner pulley mounting bolt 160, having an internally threaded cavity 162 is threadedly secured to the upper end portion 36 of the spindle 22 with the externally threaded portion of the upper end portion 36 threadedly engaged within the internally threaded cavity 162. The inner pulley mounting bolt 160 includes a cylindrical outer surface 164 formed on the lower end portion thereof. The cylindrical outer surface 164 is sized to be slidingly received within the cylindrical inner surface 166 of the drive pulley 158. When so positioned, as shown in FIG. 6, the drive pulley 158 is concentrically aligned with the vertical axis of the spindle 22. External threads 168 are formed on the inner pulley mounting bolt 160 and extend upwardly from the cylindrical outer surface 164. Wrench flats 170 are formed on the upper end portion of the inner pulley mounting bolt 160.

An internally threaded pulley mounting nut 172 is threadedly secured to the external threads 168 of the inner pulley mounting bolt 160 with the lower end face 174 of the pulley mounting nut 172 securely engaging the upper surface 176 of the drive pulley 158 thereby clamping the drive pulley between the pulley mounting nut 172 and the inner race 154 of the bearing 150 to provide driving securement between the drive pulley 158 and the spindle 22. It will be understood that relative rotation between the spindle 22 and the inner pulley mounting bolt 160 is prevented by threading the inner pulley mounting bolt 160 downwardly on the spindle 22 until the upper end face 178 of the spindle 22 abuts the floor 180 of the internally threaded cavity 162 of the inner pulley mounting bolt 160. An internally threaded locking nut 182 threadedly engages the external threads 168 and locks the pulley mounting nut 172 in proper position when the locking nut 182 abuttingly engages the upper end face 184 of the pulley mounting nut 172. To facilitate this locking action, wrench flats 186 are formed in the upper end portion of the pulley mounting nut 172 and wrench flats 188 are formed on the locking nut 182. When assembled as described above on the spindle 22, the inner pulley mounting bolt 160, pulley mounting nut 172 and locking nut 182 comprise a power input shaft in the horizontal cutter adapter attachment 14.

The inner pulley mounting bolt 160, pulley mounting nut 172 and locking nut 182 extend upwardly through an aperture 190 formed in a cover plate 192 which forms a part of the rigid housing assembly 78 and encloses the drive pulley 158 and bearing 150 to minimize the introduction of sawdust and other debris within the housing assembly.

An idler pulley subassembly 194 is mounted within the housing assembly 78 intermediate the drive pulley 158 and the driven pulley 124. The idler pulley subassembly includes a mounting bracket 196 which is fixedly secured to the inner surface of the rigid housing assembly 78 by suitable means such as threaded bolts 198. The mounting bracket 196 includes a pair of downwardly extending legs 200 and 202, each having a vertically oriented slot formed therein as shown at 204 and 206. A transverse shaft 208 extends between the legs 200 and 202 with the externally threaded opposite end portions thereof extending through the slots 204 and 206. A pair of idler pulleys 210 and 212 are journaled on the shaft 208 and are separated one from the other by two or more spacers 214 also journaled on the shaft 208.

The mounting bracket 196 further includes a horizontal cross member 216 extending between the legs 200 and 202. A vertically aligned, internally threaded aperture 218 is formed in the medial portion of the cross member 216 and is flanked on either side by vertically aligned apertures 220 and 222.

A horizontal tension adjustment plate 224 is positioned above the cross member 216 and includes a pair of downwardly extending parallel pins 226 and 228 fixedly secured thereto which are slidingly received within the apertures 220 and 222, respectively. A tension adjusting screw 230 is journaled in the tension adjustment plate 224 intermediate the pins 226 and 228. The lower end portion 232 of the screw 230 is externally threaded and is threadedly received within the internally threaded aperture 218 of the cross member 216. The lower end faces 234 and 236 of the pins 226 and 228 are positioned to abuttingly engage the transverse shaft 208 adjacent the legs 200 and 202, respectively. When the adjusting knob 238 of the adjusting screw 230 is rotated in a first direction, the tension adjustment plate 224 and pins 226 and 228 will be moved downwardly relative to the cross member 216 thus urging the transverse shaft 208 downwardly relative to the mounting bracket 196. Conversely, when the adjusting knob 238 of the adjusting screw 230 is turned in the opposite direction, the tension adjustment plate 224 and pins 226 and 228 will be moved upwardly relative to the cross member 216 thus permitting the transverse shaft 208 and idler pulleys 210 and 212 to move upwardly relative to the mounting bracket 196. Internally threaded nuts 240 and 242 can be threadedly engaged with the externally threaded opposite end portions of the transverse shaft 208 to secure the transverse shaft 208 to the mounting bracket 196 when proper positioning of the idler pulleys 210 and 212 has been achieved.

A suitable endless flexible belt 244 drivingly mutually engages the drive pulley 158 and driven pulley 124 and passes over the idler pulleys 210 and 212 therebetween. The desired amount of belt tension can be achieved by the previously described vertical adjustment of the idler pulleys 210 and 212 relative to the mounting bracket 196. Various forms of flexible drive belts may be employed in the horizontal cutter adapter attachment 14. Such suitable drive belts include conventional reinforced rubber V-belts, flat belts or belts having substantially circular cross-section. It is desirable to employ a drive pulley 158 having a substantially cylindrically shaped belt engaging surface 245 to accommodate any vertical variations in the belt engagement position occasioned by vertical adjustment of the idler pulleys 210 and 212 as described above.

A removable cover 246 is preferably included in the rigid housing assembly 78 to provide access from the top thereof to the spindle bearing housing 116 and the belt and pulley drive and adjustment mechanism housed therein. The removable cover 246 is preferably secured to the remainder of the rigid housing assembly structure by means of four threaded bolts 248. Similarly, the previously mentioned cover plate 192 is preferably secured to the remainder of the rigid housing assembly structure by means of three threaded bolts 248. A safety shield 250 is removably securable to the rigid housing assembly 78 by means of a hand-operated threaded bolt 252. The safety shield 250 extends over the horizontal power output shaft and the various cutters secured thereto to afford operator protection from the whirling cutter blades during operation of the horizontal cutter adapter attachment 14. The safety shield 250 may be readily removed for adjustment and replacement of the cutters on the shaft 120.

Figure 4:
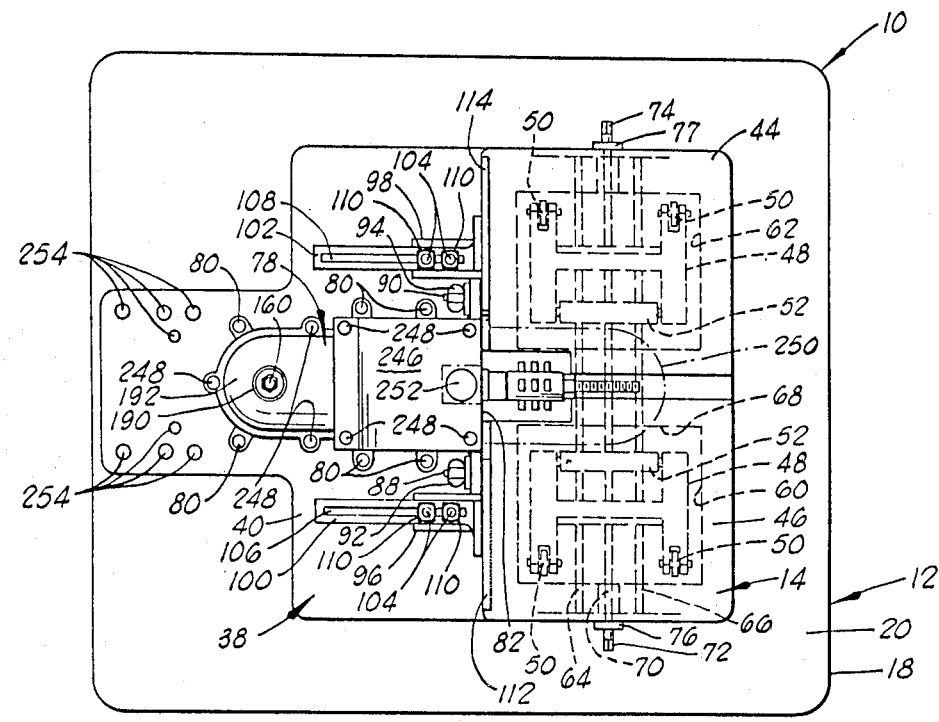
FIG. 4 is a top plan view of the universal shaper assembly of FIG. 1.

As shown in FIG. 4, the table adapter base 40 is preferably provided with a plurality of vertically aligned apertures 254 which provide means for securing the horizontal cutter adapter attachment 14 to the horizontal shaper table 18 of various forms of universal spindle shapers 12 during operation of the universal shaper assembly 10. The hole pattern for the apertures 254 may be selected to correspond with existing hole patterns in the various shaper tables currently in use. Such threaded holes are commonly employed in the existing universal spindle shapers for securing fences to the horizontal top surfaces thereof.

The table adapter base 40, workpiece table 44, support frames 48, housing assembly 78, fence brackets 100 and 102, guide fences 112 and 114, spindle bearing housing 116, cover plates 192 and 246, and safety shield 250 can each be suitably cast of aluminum or other suitable metal or metal alloy. The use of cast aluminum for these components is advantageous in providing a light weight adapter attachment which can be conveniently installed and removed from a shaper assembly and moved from place to place to facilitate on-site use of the unit.

Figure 8:
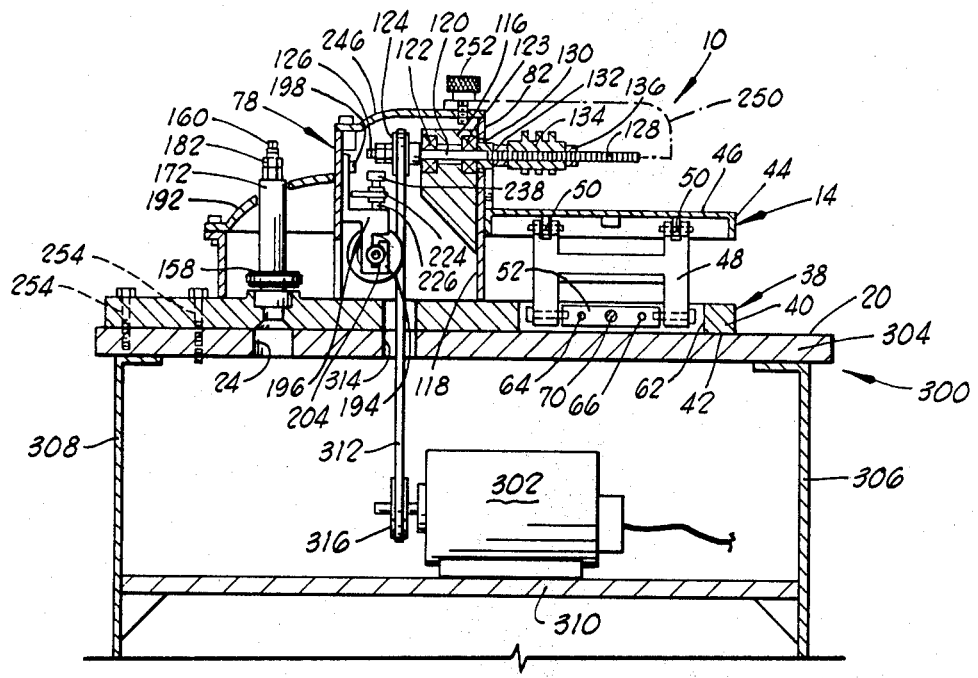
FIG. 8 is a cross-sectional view similar to FIG. 3 of the horizontal cutter assembly adapted alternatively to a standard work table and independent rotary power source.

FIG. 8 illustrates the manner in which the horizontal cutter attachment 14 may be utilized independently by merely placing the unit on a selected work table 300 and providing direct drive power from a rotary drive motor 302, e.g., a standard A-C electric motor of selected horsepower. Thus, any work table 300 having suitable horizontal surface 304 and support structure 306/308 may be constructed to include shelf mount 310 and drive motor 302. A drive belt 312 may then be led through suitable orifice 314 from a drive pulley 316 as driven by drive motor 302. Drive belt 312 is then directly connected to pulley 124 to provide connection to power output shaft 120 and shaper cutters 134. The function and usage of horizontal cutter attachment 14 thus remains the same as aforestated.

It will be seen from the foregoing detailed description that the present invention provides a horizontal cutter adapter attachment which may be incorporated in a universal spindle shaper to provide a universal shaper assembly of much greater flexibility than that provided by currently available universal spindle shapers. Further, the horizontal cutter adapter attachment of the present invention provides inexpensive, economical and flexible means for independent adaptation to enable the making of horizontal cuts on workpieces. Such increased capability and flexibility will be readily apparent to those skilled in the art.

Changes may be made in the combination and arrangement of parts or elements as heretofore set forth in the specification and shown in the drawings without departing from the spirit and scope of the invention as defined in the following claims.

What is claimed is:

1. A horizontal cutter assembly comprising: support means including a rotary power source;
   first means having a base with horizontal bottom surface supportable on the top of said support means, and having housing means including bearing housing secured on one side of said base;
   a workpiece supporting table having a horizontal top surface;
   means for adjustably securing said workpiece supporting table over the opposite side of said first means base adjacent to said bearing housing and at a selected vertical spacing above the base of said first means;
   a power output shaft horizontally journaled in rigid affixure on said first means bearing housing in disposition to extend horizontally over said workpiece horizontal top surface;
   second means for drivingly interconnecting the rotary power source and said power output shaft to transmit rotational movement to said power output shaft; and
   cutter means including a selected combination of spacing collars and shaper cutters secured on said power output shaft for horizontal rotation in selected disposition relative to said workpiece supporting table.

2. A horizontal cutter assembly as defined in claim 1, wherein said second means comprises:

belt means for directly interconnecting said rotary power source and said power output shaft to transmit rotational movement thereto.

3. A horizontal cutter assembly as set forth in claim 1, wherein said second means comprises:

drive pulling means secured to said rotary power source for rotation therewith;

driven pulley means secured to said power output shaft for rotation therewith; and flexible drive belt means mutually engaging said drive pulley means and said driven pulley means for transmitting rotational movement therebetween.

* * * * *